UNITED STATES PATENT OFFICE.

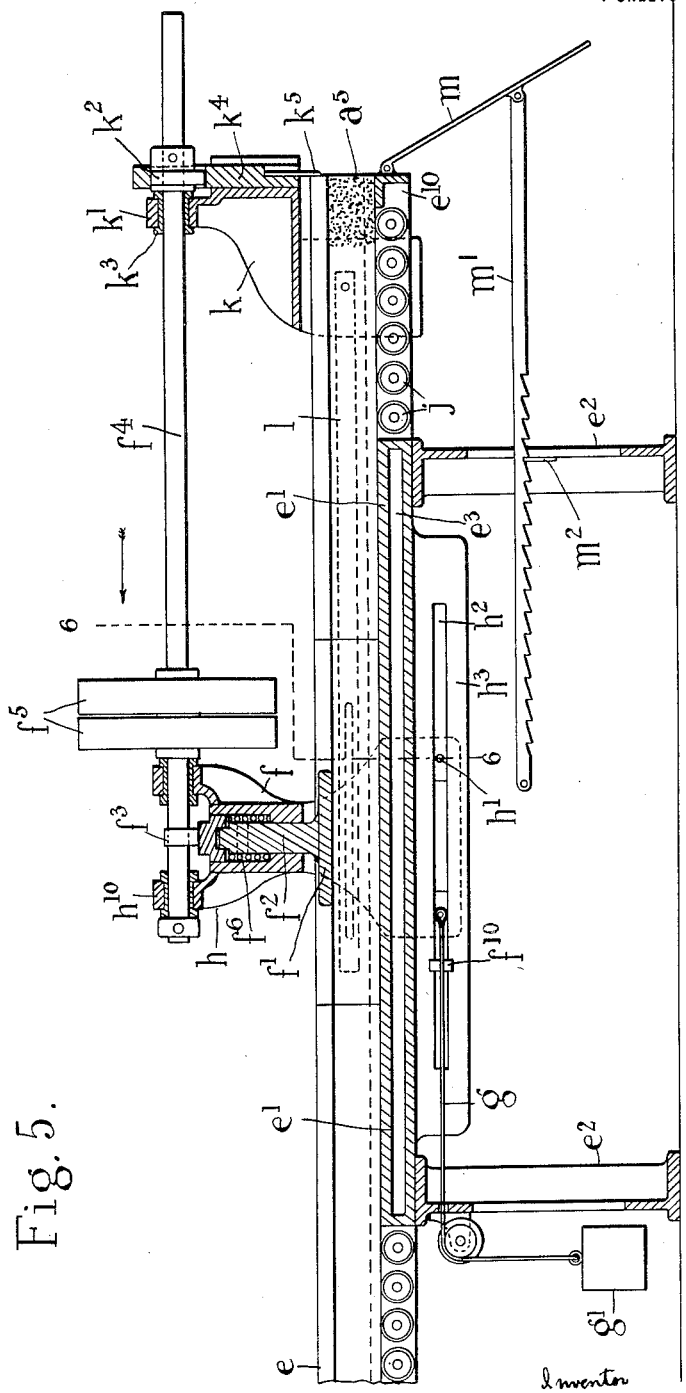

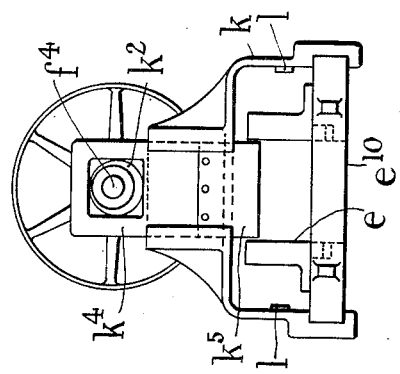
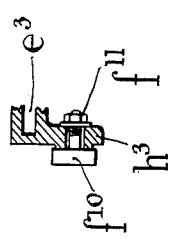
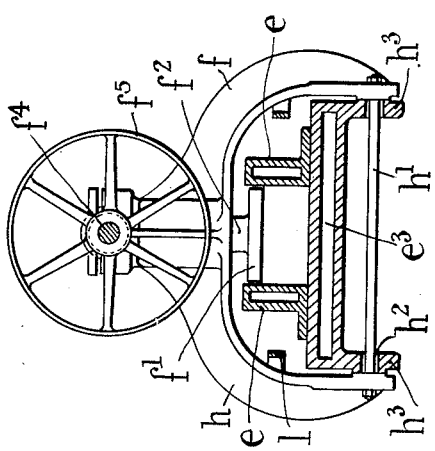

RICHARD BOWEN, OF CHELTENHAM, ENGLAND, ASSIGNOR TO LAMINATED COAL, LIMITED, OF LONDON, ENGLAND.

APPARATUS FOR THE PRODUCTION OF ARTIFICIAL FUEL.

1,397,571.     Specification of Letters Patent.     Patented Nov. 22, 1921.

Application filed April 14, 1920. Serial No. 373,821.

(GRANTED UNDER THE PROVISIONS OF THE ACT OF MARCH 3, 1921, 41 STAT. L., 1313.)

*To all whom it may concern:*

Be it known that I, RICHARD BOWEN, a subject of the King of Great Britain, residing at Marle Hill, Cheltenham, in the county of Gloucester, England, consulting engineer, have invented a new and useful Apparatus for the Production of Artificial Fuel, (for which I have filed application in Great Britain, Nov. 11, 1918, Patent No. 134,355, Jan. 24, 1920,) of which the following is a specification.

The object of the present invention is to produce suitable apparatus for manufacturing that kind of laminated artificial coal which is made from coal or coke dust mixed with pitch or the like in a heated chamber and is then formed into layers which are superposed and pressed together.

The material is of such a nature that if the layers when quite hot are immediately pressed together they will adhere so completely that the pressed mass becomes a solid block and the beneficial effect of the layers is lost. If however the pressure be applied when the layers are partially cooled, and especially if dust or water be sprayed upon them, the layers will adhere sufficiently to allow the blocks to be handled, transported and stored but the adhesion will be imperfect or of such a nature that the layers will gradually separate under the influence of heat or may be broken apart by a blow like natural coal.

According to the present invention a suitably heated container is employed which is provided with means for forming the hot material into sheets or layers and a press is employed which is adjustable with respect to the container or with respect to the means for forming the material into sheets or layers. It is thus possible to apply the pressure after the sheets have cooled to such an extent that they will not adhere perfectly so as to lose the beneficial effect of the layers but will adhere sufficiently to allow the blocks to be handled, transported and stored.

In addition to the adjustment of the press means may be provided for forcing cool air between the sheets or layers and for applying a spray of dust between them.

The invention is illustrated in the accompanying drawings in which Figure 1 is a vertical section through part of the apparatus showing means for separating the material into superposed sheets or layers and compressing them. Fig. 2 is a plan partly in section of the apparatus shown in Fig. 1.

Fig. 3 is an elevation of the dividing and compressing device shown in Fig. 1 seen in the direction of the arrow 3.

Fig. 5 is a side elevation, partly in section, of the remaining part of the apparatus where the sheets or layers are pressed together and where they are finally broken up into blocks.

Fig. 6 is a section on the line 6—6 of Fig. 5, seen in the direction of the arrow.

Fig. 7 is an end elevation of part of Fig. 5. Fig. 8 is a detail section showing an adjustable stop.

The apparatus comprises a suitably heated container $a$ having an aperture $a^1$ through which the material $a^5$ in the container is extruded. The container $a$ is preferably provided with a suitable mixing device such as $a^2$ or with other suitable mixing devices of known construction. Pressure is applied to the material $a^5$ in the container $a$ by any suitable means such as a screw conveyer $b$ or in other suitable manner. $a^3$ is a steam or hot water jacket.

Figure 1:
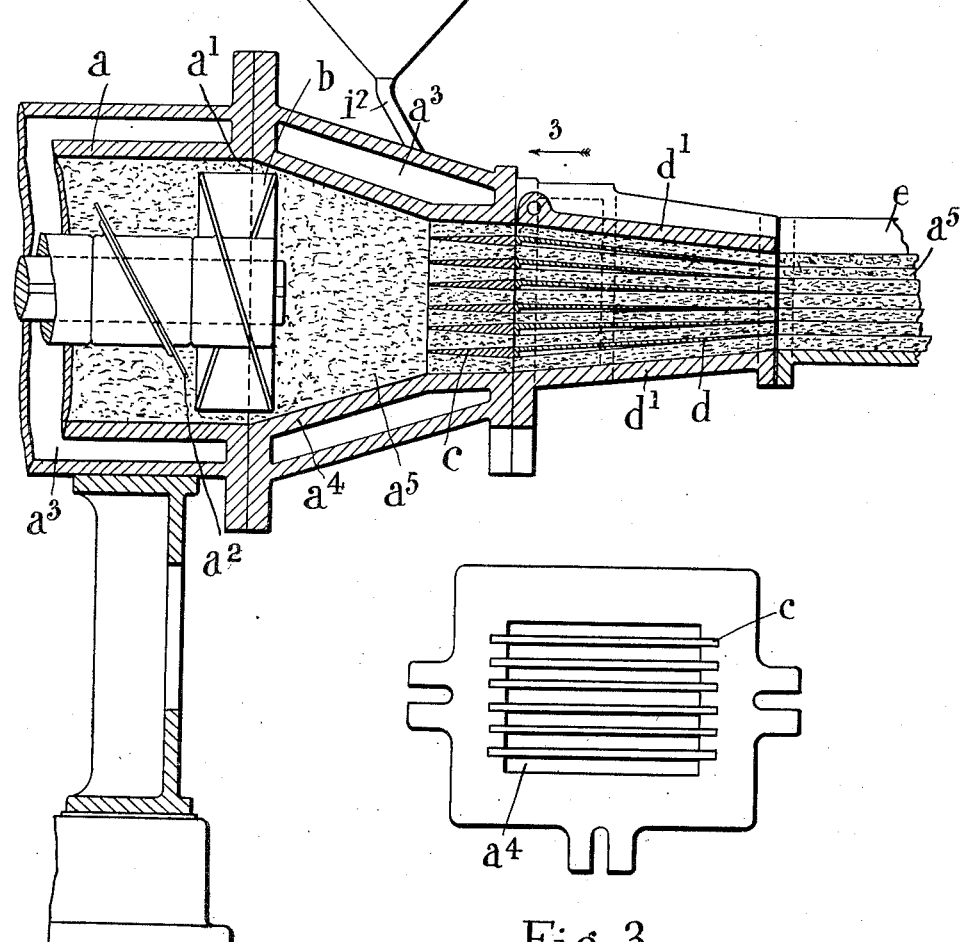
Figure 2:
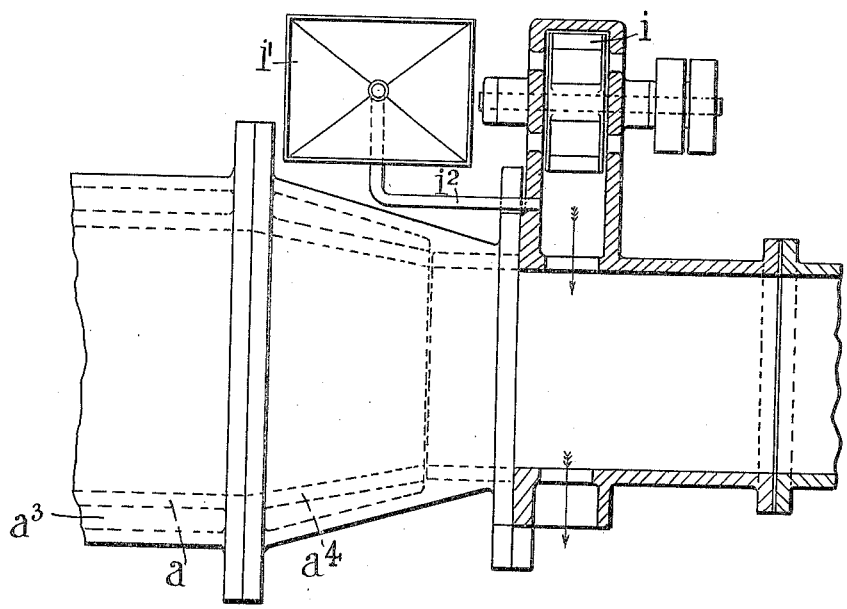
Figure 4:
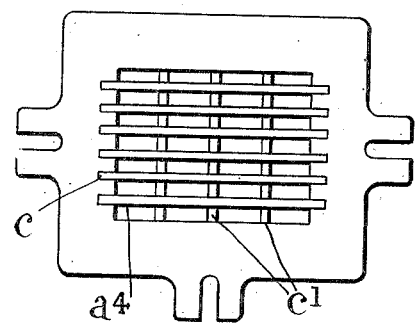
Fig. 4 is an elevation of a modified construction of dividing and compressing device.

The chamber $a$ is provided with an outlet passage $a^4$ which is preferably gradually reduced in cross section toward the outlet itself as shown in Figs. 1 and 2. This latter is rectangular in elevation at its outlet end as shown in Figs. 3 and 4 and has horizontally arranged knives $c$ which are preferably much thicker at the outlet ends than at their inner ends. The outlet passage $a^4$ may also be provided as shown in Fig. 4 with vertical knives $c^1$ which will weaken the compressed material $a^5$ longitudinally and allow it to be more readily broken up into suitable lumps for combustion.

Such knives $c$ and $c^1$ have already been used in the manufacture of brisquets for cutting the plastic material into layers and strips which have been further cut into suitable lengths by means of slicing knives. In such prior use the knives have been employed to permanently divide the material whereas in accordance with the present invention such knives are only employed to temporarily divide the material which after treatment is subsequently subjected to pressure to cause the parts to again adhere in a somewhat imperfect manner and to possess the beneficial characteristics before mentioned.

Each knife $c$ is contiguous to a carrying plate $d$ the upper surface of which coincides with the upper edge of a knife $c$ and these plates $d$ are thinner than the thick ends of the knives. The carrying plates $d$ are sharpened at the opposite ends to the knives $c$ and converge until their sharpened edges are at a distance apart equal to the spaces between the thick ends of the knives $c$. Top and bottom plates $d^1$ are also provided the adjacent edges of which correspond at one end with the exit of the passage $a^4$ through which the material $a^5$ is extruded. These top and bottom plates $d^1$ likewise converge at their ends distant from the said aperture and the top and bottom plates $d^1$ and the before mentioned carrying plates $d$ all terminate at the same distance from the aperture. Beyond the ends of the carrying plates $d$, $d^1$ is arranged a trough $e$ and table or bed $e^1$ which is supported by standards $e^2$. The standards $e^2$ and its upper frame or bed $e^1$ may slide longitudinally beneath the trough $e$ and be fixed at any desired distance from the knives $c$. The frame or bed $e^1$ also carries a suitable press $f$ which latter is adapted to slide horizontally on the frame or bed $e^1$ and means such as a cord $g$ and weight $g^1$ or springs are provided for returning the press $f$ to its original or starting position against an adjustable stop $f^{10}$.

This adjustable stop $f^{10}$ may be in the form of a bolt which passes through the slot $h^2$ in the flange $h^3$ and is fastened in the desired position by a washer and nut $f^{11}$.

The position of the stop $f^{10}$ is so regulated with respect to the orifice in the container that the press acts upon the material after it has cooled to the desired temperature, so that although the parts will adhere yet it will be in an imperfect manner as already described. Such sliding presses are known in the art of pressing tiles but heretofore they have not been returned against an adjustable stop and have not been employed to apply pressure to material which has partially cooled.

The press may consist of a plate $f^1$ carried by a vertical plunger $f^2$ which is depressed by a cam $f^3$ or eccentric $f^3$ mounted upon a horizontal shaft $f^4$ driven by a pulley $f^5$ and strap or other device which will allow the press to slide. The cam or eccentric $f^3$ preferably acts upon the plunger $f^2$ against the action of a spring $f^6$. These parts are all carried by a frame $h$ having cross rods $h^1$ passing through slots $h^2$ in flanges $h^3$ depending from the frame or bed $e^1$.

According to the prior invention by the same applicant the faces of each layer are suitably treated to prevent perfect adhesion of the layers. The treatment may merely consist in allowing the faces to partly cool and in this case it is only necessary to adjust the press to a suitable distance from the outlet passage $a^4$ by sliding the frame or bed $e^1$ beneath the trough $e$ or by adjusting the stop $f^{10}$ to allow the requisite cooling to take place. The amount of cooling will depend upon the temperature and nature of the mass being treated and the temperature of the atmosphere.

If further treatment be required to prevent the layers adhering too perfectly together a fan $i$ may be employed to drive air, fine water spray or powder between the layers as they pass along the carrying plates $d$, $d^1$ toward the press at which part of their travel one face of each layer except the top layer is exposed. $i^1$ is a hopper to contain water or dust which passes through the pipe $i^2$ into the path of the air blast produced by the fan $i$. The table $e^1$ may be made hollow at $e^3$ and cold water or air may be caused to pass therethrough for more rapidly cooling the layers.

The bottom of the trough $e$ is preferably provided at each end of the table $e^1$ with rollers $j$ to facilitate the passage of the material. If it be desired to slide the table $e^1$ beneath the trough $e$ some rollers $j$ are removed at one end and replaced at the other end of the table.

The shaft $f^4$ which is supported at one end in bearings $h^{10}$ in the sliding frame $h$, is supported at the other end in bearings $k^1$ in a support $k$ which is mounted to slide upon the end of the extension $e^{10}$ of the frame or bed $e^1$. On the shaft $f^4$ is fixed a cam or eccentric $k^2$. A sleeve or bearing $k^3$ is fixed on the shaft $f^4$ and has collars fitting against the faces of the bearing $k^1$. The cam or eccentric $k^2$ acts within an aperture in a slide $k^4$ adapted to slide vertically within the support $k$.

To the lower end of the slide $k^4$ is fixed a knife $k^5$ to cut or break up the material as it passes over the end of the extension $e^{10}$.

The supports $h$ and $k$ are connected by rods $l$ and move together in one direction due to the contact of the press $f$ and knife $k^5$ with the moving material and in the reverse direction due to the action of the cord $g$ and weight $g^1$.

A plate $m$ is hinged to the extension $e^{10}$ and it is provided with a hinged rack $m^1$ which is moved over a plate $m^2$ carried by a standard $e^2$. The rack $m^1$ enables the plate $m$ to be fixed at various angles to throw the broken material in the direction desired.

The apparatus acts in the following manner:—

The heated material under pressure is further compressed as it passes through the outlet passage of gradually reduced diameter and it is finally pressed as it is forced between the knives. It leaves the knives in separated layers where it cools or is otherwise treated as above explained to prevent the layers adhering perfectly when pressed. The layers then unite one above the other, travel along the trough table or bed and pass beneath the press. Immediately the press acts upon the material this latter carries the press along with it. As soon as the press releases the material the press is returned to its original position nearer to the knives and again immediately acts upon the material. The material after it has passed the press moves along the trough, table or bed and is finally broken or cut into lumps of a size suitable for combustion.

What I claim as my invention is:—

1. Apparatus for producing artificial fuel having in combination a container, means for extruding the material through an orifice in the container, means for separating the material into layers, a press for pressing the layers into a block and means for adjusting the distance between the press and the orifice in the container substantially as set forth.

2. Apparatus for producing artificial fuel having in combination a heated container, means for mixing the material therein, means for extruding the material through an outlet passage, knives in said outlet passage, a press for pressing the material into a block and means for adjusting the distance between the press and the knives substantially as set forth.

3. Apparatus for producing artificial fuel having in combination a heated container, means for mixing the material therein, means for extruding the material through an outlet passage, knives in said outlet passage, said knives being thicker at their outer ends than at their inner ends, a press for pressing the material into a block and means for adjusting the distance between the press and the knives substantially as set forth.

4. Apparatus for producing artificial fuel having in combination a heated container, means for mixing the material therein, means for extruding the material through an outlet passage, horizontal knives in said outlet passage, plates thinner than the knives upon which the layers of material slide, a trough to receive the material, a table carrying said trough and adapted to be slidden underneath the trough, and a press carried by said table substantially as set forth.

5. Apparatus for producing artificial fuel having in combination a heated container, means for mixing the material therein, means for extruding the material through an outlet passage, horizontal knives in said outlet passage, plates thinner than the knives upon which the layers of material slide, a trough to receive the material, a table carrying said trough and adapted to be slidden underneath the trough, a press slidably mounted on the table and adapted to move forward with the material, an adjustable stop on said table and means for returning the press against the adjustable stop substantially as set forth.

6. Apparatus for producing artificial fuel having in combination a heated container, means for mixing the material therein, means for extruding the material through an outlet passage, horizontal knives in said outlet passage, plates thinner than the knives upon which the layers of material slide, a fan to blow through said layers of material, a trough to receive the material, a table to carry said trough, a press slidably mounted on said table and adapted to move forward with the material, an adjustable stop on said table and means for returning the press against the adjustable stop substantially as set forth.

7. Apparatus for producing artificial fuel having in combination a heated container, means for mixing the material therein, means for extruding the material through an outlet passage, horizontal knives in said outlet passage, plates thinner than the knives upon which the layers of material slide, a trough to receive the material, a table carrying said trough and adapted to be slidden underneath the trough, a press carried by a frame slidably mounted on the table, a support carrying a knife slidably mounted upon an extension of the table, bearings carried by the frame of the press and the support, a shaft mounted in said bearings, means operated by the shaft for actuating the press and the knife, means for connecting the frame of the press and the support, an adjustable stop carried by the table and means for returning the frame of the press against the adjustable stop substantially as set forth.

RICHARD BOWEN.